Patented Dec. 3, 1935

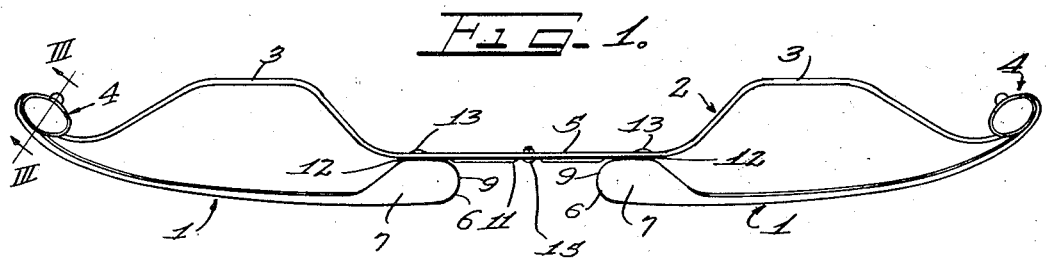
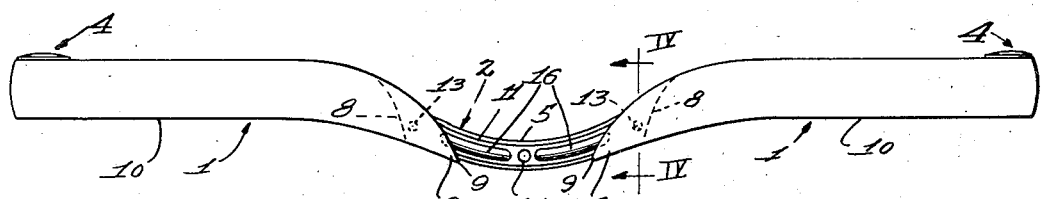
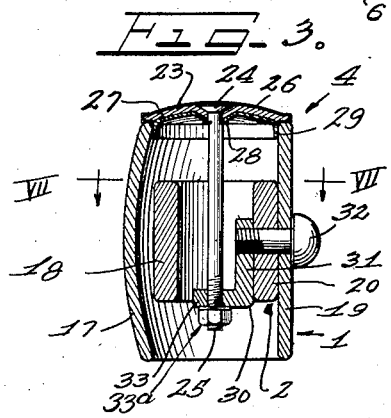
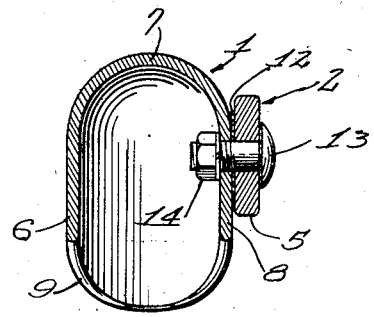
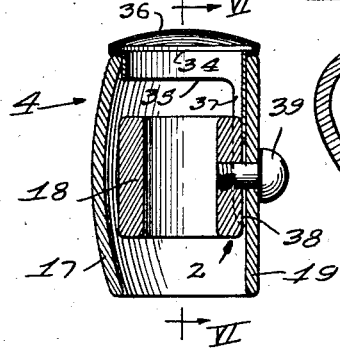
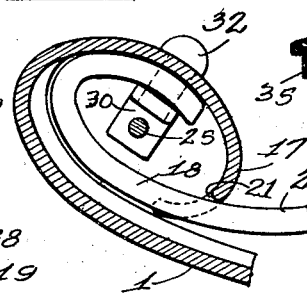
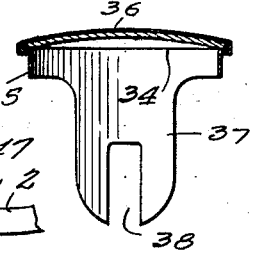

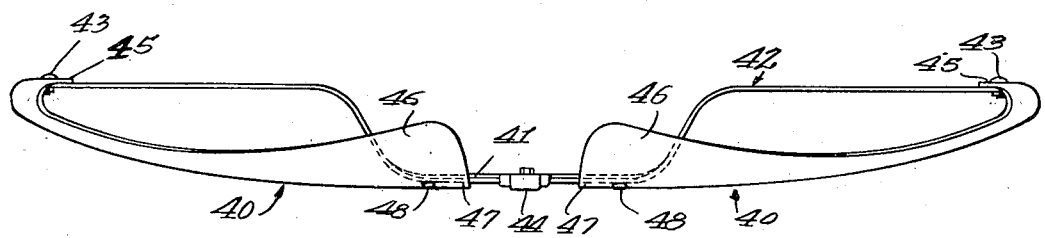
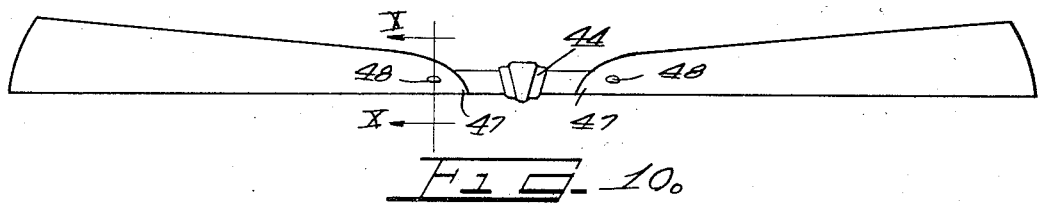
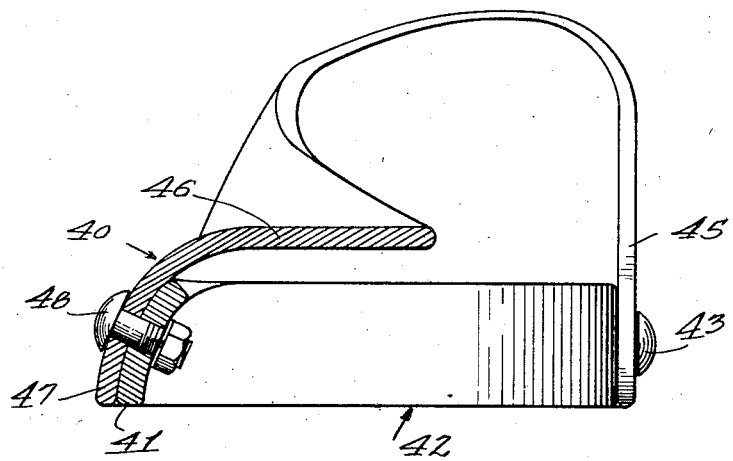

2,023,081

UNITED STATES PATENT OFFICE 2,023,081

BUMPER CONSTRUCTION

Herbert S. Jandus, Detroit, Mich., assignor to General Spring Bumper Corporation, Detroit, Mich., a corporation of Michigan Application June 26, 1933, Serial No. 677,584

16 Claims. (Cl. 293—55)

This invention has to do with bumpers for automobiles.

One of the objects of this invention is to provide a bumper of simple construction and embodying spaced impact sections and a back or cushion bar supplying means for linking the sections.

Another object of the invention involves the provision of an automobile bumper of composite or built-up construction which is of sufficient rigidity to withstand shocks to which bumpers are ordinarily subjected in use, and at the same time of the desired design to harmonize with the radiator design to thereby enhance the appearance of the automobile.

It is a further object of the invention to provide an improved connection between the ends of an impact structure and the ends of a supporting structure.

It is a still further object of the invention to provide a bumper structure embodying connected impact and back bar members, the structure being such that the means connecting the bars are substantially concealed when the bumper is viewed in front elevation.

The invention contemplates as a further object the provision of end connections affording substantially pivotal movement between the impact and cushion bars of a bumper, together with ornamental means for concealing the connections.

It is a further object of the invention to provide improved means for holding an ornamental cap for an impact bar eye in operative position.

Another object of the invention resides in the provision of a sectional impact structure embodying spaced members bridged by a cushion bar, said sections being formed to have increased resistance to impact adjacent the center of the bumper structure.

According to the general features of the invention, one form of the invention contemplates the provision of spaced impact sections including portions adjacent their inner spaced ends extending generally horizontally to increase resistance to impact, and a cushion bar connected to the remote ends of the sections and at its intermediate portion bridging the gap between the inner ends of the sections. The bridging portion may be provided with an ornamental strip of molding or beading which is positioned between the spaced ends of the sections and the back bar, and the three parts united as by bolts or rivets. The ornamental portion of the beading is thereby visible between the spaced ends of the sections to improve the appearance of the bumper as a whole, and in the event the said ends are formed to converge downwardly, for example, the bridging portion of the back bar may be formed with a downward dip to harmonize with the design afforded by the converging ends of the sections. The connecting means is preferably so located as to be invisible from the front, so that a substantial improvement over bumpers heretofore in vogue is afforded.

In accordance with a further form of the invention, the rearwardly turned portions of the spaced ends of the sections may be free and arranged to overlie the central portion of the back bar as the same is bowed forwardly to be connected to said ends and to bridge the gap between the same.

In accordance with a still further form of the invention, an improved pivotal connection is afforded between the ends of the impact and cushion members. To this end, said ends are formed as eyes, one fitting in the other, and bolt or rivet means applied at one point to rigidly secure the eyes together at that point. The eyes are preferably somewhat spaced from each other from their point of connection so that, as the bars flex toward and away from each other due to impacts, said eyes tend to roll with respace to each other. For the purpose of concealing the inner eye, an ornamental cap is applied to the outer eye, said cap being formed with reinforcing means to resist deformation. Special means cooperating with the connecting means for the eyes are provided to hold the ornamental cap securely in position.

Further objects and advantages of the invention will appear as the description proceeds.

The invention (in preferred forms) is illustrated in the drawings and hereinafter more fully described.

Figure 1 is a plan view of one form of the invention.

Figure 2 is an elevational view of the structure shown on Figure 1.

Figure 3 is an enlarged sectional view taken substantially in the plane designated by the line III—III in Figure 1, certain parts being shown in elevation.

Figure 4 is an enlarged sectional view taken substantially in the plane designated by the line IV—IV in Figure 2, certain parts being shown in elevation.

Figure 5 is a view similar to Figure 3 but showing a modified form of the invention.

Figure 6 is a sectional view taken substantially in the plane indicated by the line VI—VI in Figure 5, of the ornamental cap construction only.

Figure 7 is a fragmentary sectional view taken substantially in the plane designated by the line VII—VII in Figure 3.

Figure 8 is a plan view of a modified bumper construction.

Figure 9 is an elevational view of the structure shown in Figure 8.

Figure 10 is an enlarged sectional view taken substantially in the plane designated by the line X—X in Figure 9, certain parts being shown in elevation.

Referring now more particularly to the drawings, the impact structure in accordance with one form of the invention includes spaced substantially symmetrically arranged sections 1 which may be of any desired cross-sectional shape, that here shown being concavo-convex, with the convex surface forming the impact surface of the bumper. A cushion bar 2 is formed with rearwardly extending portions 3 for connection to the chassis frame members (not shown), is connected at its ends at 4 to the outer ends of the sections 1 by means to be hereinafter described in detail, and has its central portion 5 forwardly bowed to meet and be secured to the spaced inner ends 6 of the sections 1. The end 6 of each section 1 is of generally inverted channel formation and increasing in depth in the direction of the connection 4, and is of slight extent compared to the overall length of the section 1. Thus each end 6 has a substantial portion thereof extending rearwardly at 7 and downwardly at 8, the portion 8 being substantially vertical and parallel to the adjacent bowed portion 5 of the back bar 2. The end 6 may be arranged in any desired relation to the remainder of the section 1 to provide any desired ornamental form, and for purposes of illustration, said end is shown as extending downwardly as well as inwardly from the section 1 to harmonize with the currently popular design of radiator as well as to provide clearance for disclosing to view the bottom of the radiator. The formation of the end 6 may be effected by folding over the upper corner of the inner end portion of the section 1 to provide an edge 9 which is a substantial continuation of the edge 10 of the remainder of the section 1.

To carry out the esthetic effect produced by the downwardly converging ends 6 of the sections 1, the bowed portion 5 of the cushion bar 2 may be formed with a dip or with a downward edge bend as shown in Figure 2.

To further enhance the appearance of the bumper structure, ornamental molding or beading such as the embossed strip 11 may be provided. In accordance with the illustrated embodiment of the invention, the strip 11 is shaped to conform with the dip in the bowed portion 5 of the back bar 2 as shown in Figure 2, and is of such length that its end portions are positioned between the bowed portion 5 and the rear end downwardly extending portions 8 of the ends 6 of the sections 1, as shown at 12. These portions of the back bar 2, ornamental strip 11 and impact sections 1 are pierced by suitable fastening means such as the bolt means 13, suitable lock washer and nut means being applied to the free threaded ends of said means to rigidly secure the parts together. While the bolt means is shown with the nut 14 located within the channel end 6 of each impact section 1, and such arrangement is preferred so that there may be no obstructions to mar the appearance of the bumper as a whole, it is to be understood nevertheless that if desired the bolt means 13 may be reversed so that the nut 14 is on the outside. It will be observed that, with the arrangement shown, adequate space is provided in the channel ends 6 to receive a tool for applying and tightening the nuts 14. If desired, a bolt 15 may be applied centrally to the strip 11 to hold the same tightly in engagement with the bowed portion of the back bar 3. In such event, in order to carry out the esthetic scheme of the strip 11 as a whole, it is desirable to have the head of the bolt 15 of substantially the same diameter as the width of the embossed portions 16 of the strip 11.

It will be observed from the foregoing that the sections 1 are rigidly secured to the back bar 2 in such a manner as to substantially conceal the securing means without in any way sacrificing the efficacy of the connections. The sections 1 and cushion bar 2 are preferably of resilient material such as bar steel, and the end portions 6 of the sections are adequately reinforced by virtue of their channel construction to enable such ends to adequately withstand impacts at the central portion of the bumper.

In accordance with the form of eye construction illustrated in Figure 3, each impact section 1 is formed with an eye which may be cylindrical but, for ornamental purposes, is herein disclosed as substantially oval as shown at 17. The eye 17 is preferably formed by bending the end portion of the impact section backward and then forward. Each end of the cushion bar 2 is formed likewise with a generally oval shaped eye 18 arranged to fit within the impact section eye 17. When a cross-sectionally arcuate bar structure such as illustrated is employed, the end portion 19 thereof is preferably flattened as shown to receive the end portion 20 of the cushion bar eye 18 so that a substantial area of contact between them may exist. In order that the cushion bar eye 18 may pass easily into the outer eye 17, the latter is formed with a horizontal slot 21 as shown in Figure 7 substantially centrally of its height and extending from the end of the eye 17 a sufficient distance to accommodate the minor axial dimension of the oval shaped inner eye 18, or at least enable the eye 18 to be threaded into the eye 17.

The flattened portion 19 adjacent the extremity of the eye 17 and the adjacent portion 20 of the inner eye 18 are rigidly secured together as by the fastening elements 32 passing therethrough. It will thus be observed that when the end portions of the impact sections 1 and cushion bar 2 are caused to flex relative to one another in response to impacts, a rolling action will take place between the outer surface of the eye 18 and the inner surface of the eye 17, each of said eyes thereby substantially reinforcing the other and permitting the resilient bars of the bumper structure to properly yield.

To the end that the interior of the outer eyes 17 may be concealed and that the appearance of the end portions of the bumper structure may be enhanced, suitable ornamental caps are provided. One form of such ornamental means is disclosed in detail in Figure 3 and comprises a dished disc 23 of rigid construction mounted on and fitted against the head 24 of a bolt 25 in such a manner that the outer surface of the head is substantially flush with the convex surface of the disc 23. The disc 23 is covered with a sheath 26 of relatively thin sheet metal which is spun around the peripheral edge and underneath the same to be fixedly secured to the disc 23, the dimensions of the parts being such that the underspun portion will rest upon the upper edge of the eye 17, and the bolt is preferably arranged centrally of the disc member 23. A second sheath 27 is applied to the bolt 25 so that it is engaged with the under surface of the disc 23, opposed portions of the bolt 25 being upset at 28 to permanently hold the sheath 27 in assembled relation with the disc 23. The sheath 27 is formed with a downwardly extending peripheral flange 29 arranged to fit snugly within the eye 17 at the upper portion thereof as shown in Figure 3.

To the end that the ornamental cap structure may be securely held in position, a substantially L-shaped anchor 30 is provided. The anchor 30 has an upstanding arm 31 which is threaded to receive the threaded extremity of the fastening screw 32. The horizontally extending arm 33 of the anchor 30 is formed with an opening arranged axially of the eye 18 and through which the threaded extremity of the bolt 25 passes, said extremity receiving a lock washer and nut 33a which, when securely tightened toward the horizontal arm 33 of the anchor, securely holds the ornamental cap structure in position. The member 30 thus functions as an anchor both for the securing element 32 and for the cap structure.

A somewhat simpler ornamenting and anchoring structure is shown in Figure 5, wherein the eye construction is substantially the same as that described in connection with Figure 3 and is accordingly designated by identical reference characters. In this modified form of the invention, no bolt and anchoring element is employed. Instead a substantially rigid element in the general form of a spherical segment 34 is provided. A short thin sheet metal ring 35 is formed upwardly with a horizontal and then a vertical flange to provide a horizontal circumferential shoulder upon which the segment 34 rests, and a vertical shoulder which surrounds the base of the segment. A top sheath 36 of similar material to the ring piece 35 is placed over the segment 34 and the peripheral edge of the same spun downwardly and inwardly over the flanges of the piece 35 thereby providing a unitary structure. The annular piece 35 is formed to fit snugly within the upper part of the outer eye 17, the laterally extending flange of the cap structure resting upon the upper edge of the eye 17 as shown in Figure 5.

To the end that the piece 35 may be securely held in place, the same is formed with a depending arm 37 curved to conform with the inner curvature of and to engage the portion 19 of the eye 17, and is slotted at 38 to allow the securing screw or other element 39 to pass therethrough. Instead of arranging the inner eye 18 so that the same is in direct contact with the portion 19 as is true in the form of the invention shown in Figure 3, the eye 18 in the form shown in Figure 5 is arranged to firmly engage the inner surface of the depending arm 37, and the securing element 39 is threaded directly into eye 18 so that the eyes are held in proper cooperative relation to each other and at the same time the arm 37 is firmly sandwiched between the eyes so that the cap structure is securely held in position.

It will be appreciated that in addition to the advantages set forth above in a construction of this character embodying impact sections, the eyes of the respective bars may be assembled without requiring a flexing pressure which would be required if the impact structure were made in a single integral piece.

In Figures 8, 9 and 10 is shown a modified bumper construction embodying spaced impact sections 40 bridged by a bowed portion 41 of the cushion bar 42, the ends of the impact and supporting bar structures being rigidly connected by bolts or the like 43 instead of by pivotal connections as is shown in the previously described form of the invention. Of course, it is to be understood that the impact and support bar members of Figure 8 may if desired be connected pivotally as shown in Figure 1 or in any other suitable manner. The ornamentation for the forwardly bowed portion 41 of the support bar 42 may take the form shown in Figure 1, or, if desired, may be in the form of a medallion secured preferably centrally of the exposed bowed portion 41 as shown at 44. As illustrated, the end portions of the impact sections 40 are folded rearwardly to provide securing flaps 45 disposed behind the sections 40 so that the connections at 43 may not be seen from the front. The effect of downwardly converging portions of the impact bar in accordance with this form of the invention may be provided by bending each impact section backwardly in increasing amounts as the center of the impact structure is approached, as clearly shown in Figure 8. This structure also provides for increased resistance at the central portion of the impact structure against horizontal flexure, and the bowed portion 41 of the cushion bar 42, in addition to affording a continuation of the impact structure by bridging the gap between the spaced inner ends 47 of the sections 40, also serves to reinforce the said ends 47 against impacts. Suitable bolt means 48 serves to connect the end portions 47 of the sections 40, and it will be observed that only the heads of said means are visible, the remaining portions thereof being concealed by the overhanging portions 46 of the sections 40. Although the heads of these bolts are shown to be substantially round, it is to be understood that they may assume any desired ornamental shape.

From the foregoing, it is evident that in accordance with the present invention there is provided a bumper of simple construction involving few parts which may be manufactured at low cost and which nevertheless provides an ornamental effect which could be obtained by the employment of a single integral impact bar only at a relatively prohibitive cost and yet which provides sufficient rigidity of parts to enable the same to function as efficiently as an integral impact bar.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. Bumper construction comprising horizontally spaced impact sections, supporting bar structure therefor, said structure bridging the gap between said sections, means rigidly securing said structure to the inner and outer portions of said sections, the intermediate portions of said sections being spaced forwardly from said structure to thereby afford substantially elliptic springs, the outer portions of said sections and structure extending between the places of securement of said sections and structure being nested together in normally somewhat spaced relation, so that as the intermediate portions of each spring approach each other in response to impacts, each of the nested portions affords a bearing upon which the associated nested portion rolls to assist in absorbing the shocks incident to such impacts.

2. In a bumper construction including front and back bars arranged to yield horizontally relative to each other, an end connection for assisting said bars in absorbing shocks incident to impacts, said connection including eyes on the bars, and means connecting portions of said eyes together against relative rotation and so arranged as to leave substantial portions of said eyes between said means and the remainder of the bars free of each other, so that upon approaching movement of said bars resulting from impacts, the outer of said eyes will wrap itself about the inner eye.

3. In a bumper construction including front and back bars arranged to yield horizontally relative to each other, an end connection for assisting said bars in absorbing shocks incident to impacts, said connection including eyes on the bars, and means connecting portions of said eyes together against relative rotation and so arranged as to leave substantial portions of said eyes between said means and the remainder of the bars free of each other, so that upon approaching movement of said bars resulting from impacts, the outer of said eyes will wrap itself about the inner eye, said means being located horizontally inwardly of the outer extremities of the front bar so as to be shielded thereby.

4. In an end connection for bumpers, impact and back bars having eyes, one arranged within the other, the outer eye being flexible upon relative movement of said bars, means securing portions of said eyes together, against relative rotation, and means to protect and conceal the inner eye and securing means, the protecting and concealing means comprising an ornamental cap at the top of the outer eye and having yielding radial engagement with said outer eye to fit the same after the latter has flexed.

5. In an end connection for bumpers, impact and back bars having eyes, one arranged within the other, means securing portions of said eyes together, means to protect and conceal the inner eye and securing means, the protecting and concealing means comprising an ornamental cap at the top of the outer eye and anchoring means cooperating with said securing means to firmly hold said protecting and concealing means in position, said cap being removable without substantially affecting the securement of said eyes.

6. Bumper end construction comprising impact and back bar eyes arranged one within the other, means securing portions of said eyes together against relative rotation, leaving other portions of said eyes in normally somewhat spaced relation, an ornamental cap disposed at the upper edge of the outer eye, and a connection between the securing means and the cap for firmly holding the cap in position notwithstanding relative movement between the spaced portions of said eyes.

7. An end construction for bumpers comprising impact and back bar eyes arranged one within the other, an ornamental cap disposed at the upper edge of the outer eye and formed with a sleeve fitting within said upper end of the outer eye, an arm depending from said sleeve and engaging the interior surface of the other eye, a portion of said arm being positioned between said eyes and having a slot, and means piercing said eyes and passing through said slot for firmly securing said eyes together with said arm sandwiched tightly therebetween, whereby said cap is also firmly held in place.

8. An end construction for bumpers comprising impact and back bar eyes arranged one within the other, an ornamental cap disposed at the upper edge of the outer eye and formed with a sleeve fitting within said upper end of the outer eye, an arm depending from said sleeve and engaging the interior surface of the other eye, a portion of said arm being positioned between said eyes and having a slot, and means piercing said eyes and passing through said slot for firmly securing said eyes together with said arm sandwiched tightly therebetween, whereby said cap is also firmly held in place, the portions of said eyes spaced from said securing means being capable of relative movement without, however, affecting the anchoring of said cap.

9. An ornamental cap structure for bumper end eye connections comprising a rigid disc, an ornamental sheath of cup-shape having its rim flanged inwardly against a face of said disc to secure the same therein, a stem having a head positioned between said disc and said sheath and projecting away from said sheath, a second cup-shaped sheath surrounding said stem and covering the free side of said disc, said stem being upset adjacent the second sheath to provide retaining means holding said second sheath against said disc.

10. An ornamental cap structure for bumper end eye connections comprising a rigid disc, an ornamental sheath of cup-shape having its rim flanged inwardly against a face of said disc to secure the same therein, a stem having a head positioned between said disc and said sheath and projecting away from said sheath, a second cup-shaped sheath surrounding said stem and covering the free side of said disc, said stem being upset adjacent the second sheath to provide retaining means holding said second sheath against said disc, the second sheath being formed with a peripheral flange disposed radially inwardly of the outer periphery of the first sheath and thereby forming a rabbet for fitting the interior and upper edge of a bumper eye.

11. An ornamental cap structure for bumper end eye connections comprising a rigid disc, an ornamental sheath of cup-shape having its rim flanged inwardly against a face of said disc to secure the same therein, a stem having a head positioned between said disc and said sheath and projecting away from said sheath, a second cup-shaped sheath surrounding said stem and covering the free sides of said disc, said stem being upset adjacent the second sheath to provide retaining means holding said second sheath against said disc, the second sheath being formed with a peripheral flange disposed radially inwardly of the outer periphery of the first sheath and thereby forming a rabbet for fitting the interior and upper edge of a bumper eye, said flange of the second sheath being resilient to compensate for variations in diameter of said eye.

12. An ornamental cap structure for bumper eyes, comprising a head arranged to fit on the upper edge of a bumper eye and an inwardly offset peripheral flange for fitting the interior of the eye, said flange having a depending arm constituting a means whereby the same may be anchored to the eye, said arm constituting guide means engageable with the inner wall of the eye to facilitate positioning of the cap as the same is applied to the eye.

13. Bumper construction comprising horizontally spaced impact sections, supporting bar structure therefor, said structure bridging the gap between said sections, means piercing and rigidly securing said structure to inner and outer portions of said sections, the intermediate portions of said sections being spaced forwardly from said structure to thereby afford substantially elliptic springs, the outer portions of said sections and structure extending between the places of securement of said sections and structure being nested together in normally somewhat spaced relation, so that as the intermediate portions of each spring approach each other in response to impacts, each of the nested portions affords a bearing upon which the other rolls to assist in absorbing the shocks incident to such impacts.

14. Bumper construction comprising impact and supporting structure, the impact structure comprising generally horizontally spaced impact sections extending rearwardly and outwardly to afford a substantially bowed structure, the outer parts of said sections being folded rearwardly and inwardly to provide attaching flaps concealed from the front, said supporting structure comprising a generally horizontally extending member secured to said flaps and having an intermediate forwardly bowed portion, each of said sections having a generally vertically extending portion connected to said forwardly bowed portion and a generally horizontally extending portion overhanging said forwardly bowed portion and cooperating with said bowed portion to reinforce the intermediate portion of the bumper against impacts.

15. Bumper construction comprising impact and supporting structure, the impact structure comprising generally horizontally spaced impact sections extending rearwardly and outwardly to afford a substantially bowed structure, the outer parts of said sections being folded rearwardly and inwardly to provide attaching flaps concealed from the front, said supporting structure comprising a generally horizontally extending member secured to said flaps and having an intermediate forwardly bowed portion, each of said sections having a generally vertically extending portion connected to said forwardly bowed portion and a generally horizontally extending portion overhanging the forwardly bowed portion and cooperating with said bowed portion to reinforce the intermediate portion of the bumper against impacts, said inner ends and said bowed portion being arranged with their lower edges substantially foremost and inclining upwardly and rearwardly, whereby to enable the bumper to yield torsionally as well as horizontally at its center.

16. Bumper construction comprising impact and supporting structure, the impact structure comprising generally horizontally space impact sections extending rearwardly and outwardly to afford a substantially bowed structure, the outer parts of said sections being folded rearwardly and inwardly to provide attaching flaps concealed from the front, said supporting structure comprising a generally horizontally extending member secured to said flaps and having an intermediate forwardly bowed portion, each of said sections having a generally vertically extending portion connected to said forwardly bowed portion and a generally horizontally extending portion cooperating with said bowed portion to reinforce the intermediate portion of the bumper against impacts, said inner ends being arranged with their lower edges foremost and having their impact surfaces inclining upwardly and rearwardly from said edges, whereby to enable the bumper to yield torsionally in response to all horizontal impacts upon said surfaces.

HERBERT S. JANDUS.